US012610396B2

(12) United States Patent
Sundman et al.

(10) Patent No.: US 12,610,396 B2
(45) Date of Patent: Apr. 21, 2026

(54) RTS/CTS COORDINATION FOR TXOP SHARING

(71) Applicant: Telefonaktiebolaget LM Ericsson (publ), Stockholm (SE)

(72) Inventors: Dennis Sundman, Sollentuna (SE); Miguel Lopez, Solna (SE); Charlie Pettersson, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 517 days.

(21) Appl. No.: 18/008,373

(22) PCT Filed: Jun. 5, 2020

(86) PCT No.: PCT/EP2020/065721
§ 371 (c)(1),
(2) Date: Dec. 5, 2022

(87) PCT Pub. No.: WO2021/244760
PCT Pub. Date: Dec. 9, 2021

(65) Prior Publication Data
US 2023/0292363 A1      Sep. 14, 2023

(51) Int. Cl.
*H04W 74/0816* (2024.01)
*H04W 74/00* (2009.01)
*H04W 74/04* (2009.01)

(52) U.S. Cl.
CPC ..... *H04W 74/0816* (2013.01); *H04W 74/002* (2013.01); *H04W 74/04* (2013.01)

(58) Field of Classification Search
CPC ............... H04W 74/002; H04W 74/04; H04W 74/0816
See application file for complete search history.

(56) References Cited

U.S. PATENT DOCUMENTS

2011/0222398 A1* 9/2011 Ribeiro ............. H04W 74/0816
370/230
2011/0261728 A1* 10/2011 Ribeiro ................. H04W 28/26
370/280

(Continued)

FOREIGN PATENT DOCUMENTS

EP         3641458 A1      4/2020

OTHER PUBLICATIONS

Author Unknown, "Telecommunications and information exchange between systems Local and metropolitan area networks—Specific requirements; Part 11: Wireless LAN Medium Access Control (MAC) and Physical Layer (PHY) Specifications," IEEE Standard 802.11, 2016, IEEE Computer Society, 3,534 pages.

(Continued)

*Primary Examiner* — Kashif Siddiqui
(74) *Attorney, Agent, or Firm* — Withrow & Terranova, PLLC

(57) ABSTRACT

An access point of a wireless communication system configures a carrier for communication with one or more wireless devices associated with the access point. Further, the access point contends at least with one or more other access points for access to the carrier. Further, the access point cooperates with the one or more further access points by sharing a transmission opportunity, TXOP. The TXOP is reserved on the carrier by one of the access points, in response to this access point gaining access to the carrier. Before transmitting data in the shared TXOP, the access point performs a Ready-to-Send/Clear-to-Send, RTS/CTS, procedure. Further, the access point coordinates the RTS/CTS procedure with an RTS/CTS procedure respectively performed by each of the one or more other access points sharing the TXOP.

15 Claims, 15 Drawing Sheets

(56) References Cited

U.S. PATENT DOCUMENTS

| | | | | |
|---|---|---|---|---|
| 2015/0172011 A1* | 6/2015 | Aboul-Magd | ........ | H04L 5/0055 |
| | | | | 370/330 |
| 2016/0197655 A1* | 7/2016 | Lee | ....................... | H04W 48/00 |
| | | | | 370/338 |
| 2016/0381646 A1* | 12/2016 | Li | ......................... | H04W 52/36 |
| | | | | 370/338 |
| 2017/0019223 A1* | 1/2017 | Mawlawi | ............. | H04B 7/2621 |
| 2020/0077273 A1* | 3/2020 | Cherian | ................ | H04W 24/10 |
| 2020/0120544 A1* | 4/2020 | Liu | ........................ | H04W 28/26 |
| 2020/0205198 A1* | 6/2020 | Nam | ..................... | H04W 16/14 |
| 2020/0374062 A1* | 11/2020 | Verma | .................... | H04B 7/024 |
| 2021/0111855 A1* | 4/2021 | Verma | ................ | H04W 72/044 |

OTHER PUBLICATIONS

Author Unknown, "Telecommunications and information exchange between systems Local and metropolitan area networks—Specific requirements; Part 11: Wireless LAN Medium Access Control (MAC) and Physical Layer (PHY) Specifications; Amendment 1: Enhancements for High Efficiency WLAN," Draft Standard for Information Technology, IEEE P802.11ax/D6.0, Nov. 2019, 780 pages.

Guo, et al., "Coordinated Spatial Reuse Operation," IEEE 802.11-20/0033r0, Dec. 2019, 13 pages.

Li, Yunbo, et al., "BQR for 320MHz," IEEE 802.11-20/0xxxr0, May 1, 2020, 9 pages.

Li, Yunbo, et al., "MU-RTS in Multi-AP Operation," IEEE 802.11-20/0643r0, Apr. 10, 2020, 7 pages.

Li, Yunbo, et al., "NAV Setting in Multi-AP Operation," IEEE 802.11-20/0644r0, Apr. 10, 2020, 9 pages.

Naribole, et al., "Shared TXOP protocol," IEEE 802.11-20/0277r0, Mar. 2020, 17 pages.

Park, et al., "Coordinated Spatial Reuse Procedure," IEEE 802.11-20/0410r4, Mar. 2020, 23 pages.

Verma, et al., "Coordinated AP Time/Frequency Sharing in a Transmit Opportunity in 11be," IEEE 802.11-19/1582r1, Jan. 2020, 15 pages.

International Search Report and Written Opinion for International Patent Application No. PCT/EP2020/0065721, mailed Jan. 25, 2021, 10 pages.

International Preliminary Report on Patentability for International Patent Application No. PCT/EP2020/065721, mailed Aug. 30, 2022, 20 pages.

* cited by examiner

| TX Indication and Request | Schedule Allocation | Data TX |
|---|---|---|

TXOP Duration

FIG. 1A

| AP1 | | CTI | | | CTAS | CTLS | DL Data Tx |
| AP2 | | | CTR | | | CTLS | DL Data Tx |
| AP3 | | | CTR | | | CTLS | DL Data Tx |
| AP4 | | | | | | | |
| STA 31 | | | | | CTI-NAV | | |
| STA 32 | | | | | CTR-NAV | | |
| STA 41 | | | | | | | |

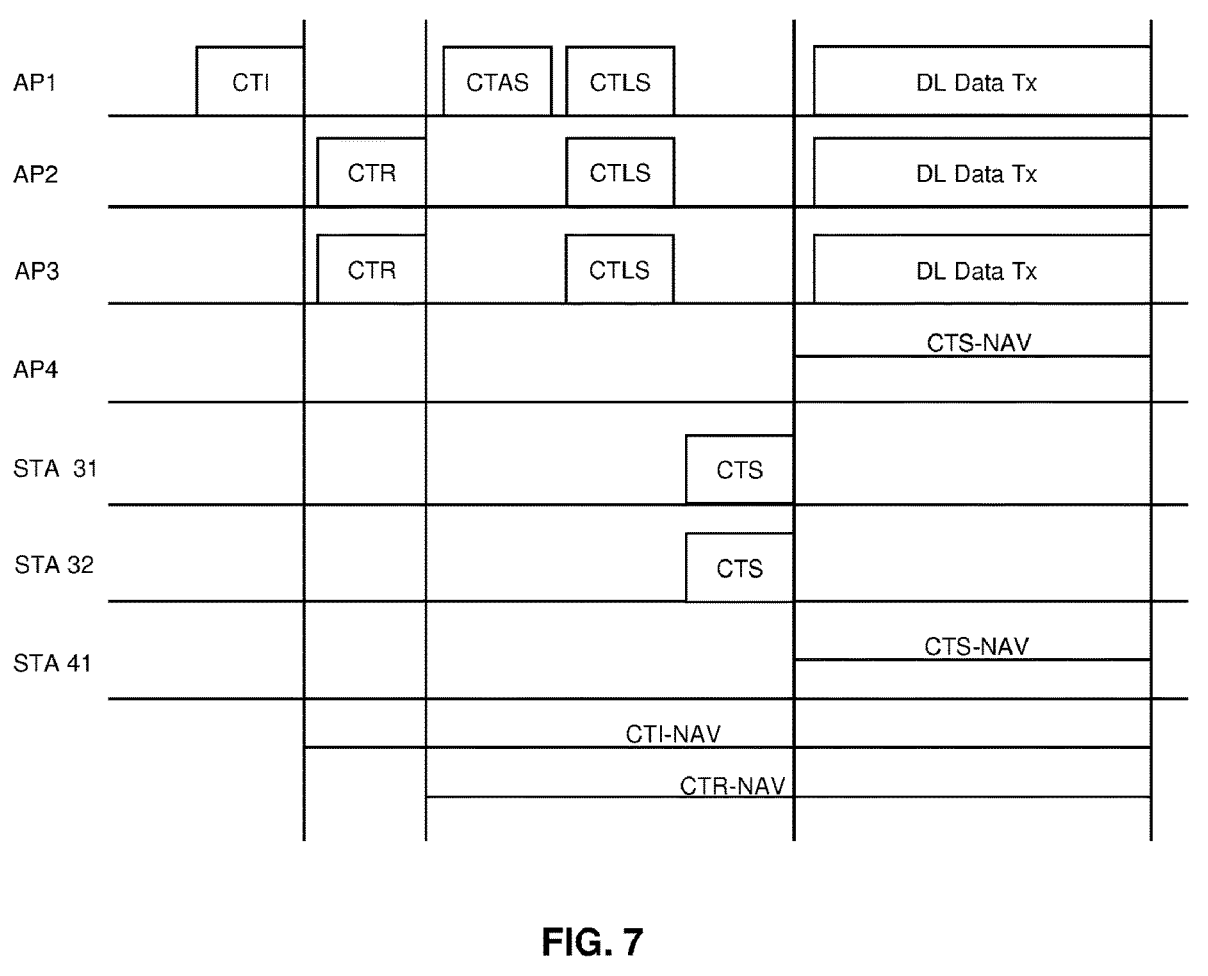

| AP1 | | CTI | | | CTAS | CTLS | | DL Data Tx | |
| AP2 | | | CTR | | | CTLS | | DL Data Tx | |
| AP3 | | | CTR | | | CTLS | | DL Data Tx | |
| AP4 | | | | | | | | CTS-NAV | |
| STA 31 | | | | | | | CTS | | |
| STA 32 | | | | | | | CTS | | |
| STA 41 | | | | | | | | CTS-NAV | |
| | | | | | | CTI-NAV | | | |
| | | | | | | CTR-NAV | | | |

FIG. 7

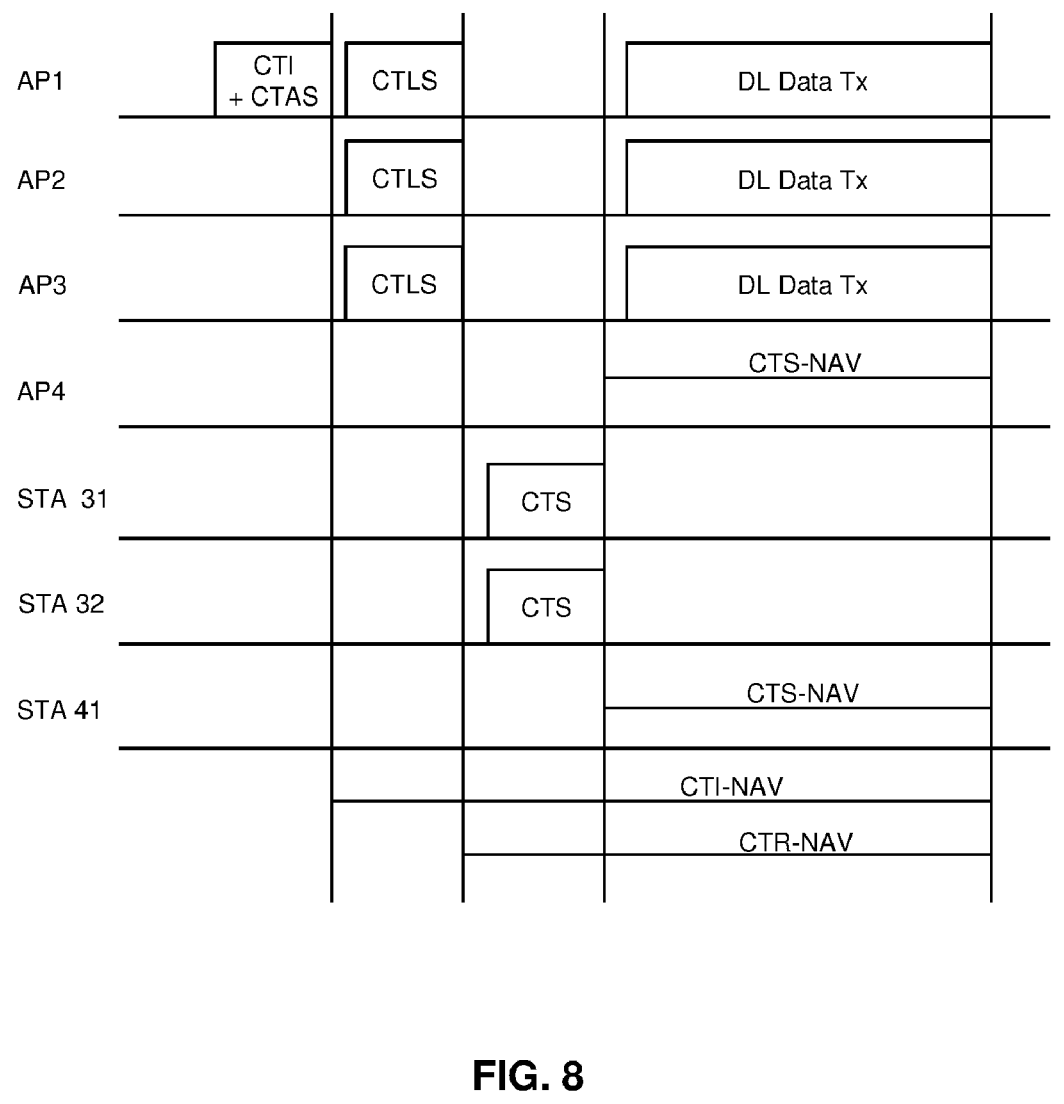

| | | | | |
|---|---|---|---|---|
| AP1 | CTI + CTAS | CTLS | | DL Data Tx |
| AP2 | | CTLS | | DL Data Tx |
| AP3 | | CTLS | | DL Data Tx |
| AP4 | | | | CTS-NAV |
| STA 31 | | | CTS | |
| STA 32 | | | CTS | |
| STA 41 | | | | CTS-NAV |
| | | | | CTI-NAV |
| | | | | CTR-NAV |

FIG. 8

910 — Configure carrier

920 — Contend for carrier

930 — Cooperate by TXOP sharing

940 — Coordinate RTS/CTS procedures

950 — Perform RTS/CTS procedure

960 — Transmit data

RTS/CTS COORDINATION FOR TXOP SHARING

This application is a 35 U.S.C. § 371 national phase filing of International Application No. PCT/EP2020/065721, filed Jun. 5, 2020, the disclosure of which is incorporated herein by reference in its entirety.

TECHNICAL FIELD

The present invention relates to methods for controlling wireless transmissions and to corresponding devices, systems, and computer programs.

BACKGROUND

In wireless communication technologies, there is an increased interest in using unlicensed bands, like the 2.4 GHz ISM band, the 5 GHz band, the 6 GHz band, and the 60 GHz band using more advanced channel access technologies. Historically, Wi-Fi has been the dominant standard in unlicensed bands when it comes to applications requiring support for high data rates. Due to the large available bandwidth and effectively no competing technology in the unlicensed band, the WLAN (Wireless Local Area Network) technology based on the IEEE 802.11 family standards provides a very simple distributed channel access mechanism based on the so-called distributed coordination function (DCF).

Distributed channel access means that a device, in IEEE 802.11 terminology known as a station (STA), tries to access the channel when it has something to send. Effectively there is no difference in channel access whether the station is an access point (AP) or a non-access point (non-AP). DCF works well as long as the load is not too high. When the load is high, and in particular when the number of stations trying to access the channel is large, channel access based on DCF does not work well. The reason for this is that there will be a high probability of collision on the channel, leading to poor channel usage.

To improve the channel usage, and in particular to allow for better support of a large number of devices, a more centralized channel access may be utilized, similar to channel access schemes utilized in cellular networks. Such centralized channel access may involve that rather than letting a station access the channel whenever it has data to send, the channel access is controlled by the AP. A corresponding channel access scheme is for example supported in the IEEE 802.11ax technology, see IEEE P802.11ax™/D6.0 Draft Standard for Information technology—Tele-communications and information exchange between systems Local and metropolitan area networks—Specific requirements Part 11: Wireless LAN Medium Access Control (MAC) and Physical Layer (PHY) Specifications Amendment 1: Enhancements for High Efficiency WLAN (November 2019), in the following denoted as "IEEE 802.11ax Draft". The IEEE 802.11ax technology for example supports orthogonal frequency division multiple access (OFDMA) in both downlink (DL), i.e., in a direction from the AP to the station, and uplink (UL), i.e., in a direction from the station to the AP. Also multi-user transmission in form of multi-user multiple input multiple output (MU-MIMO) is supported for both the DL and the UL. By supporting MU transmission and letting the AP control the channel access, efficient channel usage is achieved and one can avoid collisions due to contention within a cell, in the IEEE 802.11 terminology also referred to as basic service set (BSS).

A default channel access mechanism used in current WLAN systems is referred to as enhanced distributed channel access (EDCA), as specified in IEEE Standard for Information technology—Telecommunications and information exchange between systems Local and metropolitan area networks—Specific requirements—Part 11: Wireless LAN Medium Access Control (MAC) and Physical Layer (PHY) Specifications," in IEEE Std 802.11-2016 (Revision of IEEE Std 802.11-2012), vol., no., pp. 1-3534, 14 Dec. 2016, in the following denoted as "IEEE 802.11 PHY Specifications". In the EDCA channel access mechanism, the STA accesses the channel using a set of channel access parameters based on a traffic class of the data. The channel is obtained for a TXOP duration time, in which multiple frames of the same data class may be transmitted. The maximum size of a TXOP depends on the data type. A typical duration of a TXOP is in the range of a few milliseconds.

To improve the performance even further, coordination of channel usage between cells may be utilized. Here, one approach is to let a number of APs share a TXOP. For example, if there are two or more APs within range using the same channel, with no coordination each of them would contend for the channel and the AP that wins the contention would then reserve the channel using the TXOP concept. The other APs would have to defer from channel access and wait for the TXOP to end. Then a new contention begins and channel access may or may not be gained for a specific AP. This implies that channel access becomes rather unpredictable and support for demanding QoS (Quality of Service) applications may be challenging. Such issues may be avoided by coordinated sharing of the TXOP by multiple APs. Such features are also referred to as cooperating APs (CAP).

For example, "Coordinated AP Time/Frequency Sharing in a Transmit Opportunity in 11be", Internet document IEEE 802.11-19/1582r1 (URL: "https://mentor.ieee.org/802.11/dcn/19/11-19-1582-01-00be-coordinated-ap-time-and-frequency-sharing-in-a-transmit-opportunity-in-11be.pptx", November 2019) or "Shared TXOP protocol", Internet document IEEE 802.11-20/0277r0 (URL: https://mentor.ieee.org/802.11/dcn/20/11-20-0277-00-00be-coordinated-ofdma-protocol.pptx, March 2020) propose a time/frequency resource sharing mechanism for an enhancement of the WLAN technology referred to as EHT (Extremely High Throughput). In this mechanism multiple APs belonging to the same Extended Service Set (ESS) can coordinate and share among themselves their time/frequency resources within a TXOP. The proposed mechanism consists of the three phases, as schematically illustrated in FIG. 1A. The first phase involves transmission of a TX indication frame and a request frame. In the first phase an AP that has gained a TXOP, also denoted as the TXOP owner, indicates to other APs that it is willing to share the TXOP (by means of the TX indication frame), and one or more neighboring APs indicate their intention to participate in sharing the resources (by the request frame). The TXOP owner may also be referred to as "Sharing AP", and the participating AP(s) may also be referred to as "Shared AP(s)". The first phase may also be referred to as initial coordination phase. In the second phase the TXOP owner informs the participating APs about their allocated resources and a TX start time, and the participating APs inform their client STAs about their respective resource allocations. In the third phase the participating APs transmit on their respective allocated resources in the TXOP, beginning at the TX start time.

The sharing of the TXOP during the transmission of data in the third phase can be based on multiplexing in the time domain, e.g., TDMA (Time Division Multiple Access), multiplexing in the frequency domain, e.g., OFDMA, or multiplexing in the spatial domain, e.g., using MU-MIMO (Multi-User Multiple Input/Multiple Output). Further, the sharing can be based on spatial reuse, i.e., rather than multiplexing the resources of the TXOP, the resources can be used simultaneously, sometimes in combination with transmit power control, e.g., as described in "Coordinated Spatial Reuse Operation", Internet document IEEE 802.11-20/0033r0 (URL: https://mentor.ieee.org/802.11/dcn/20/11-20-0033-00-00be-coordinated-spatial-reuse-operation.pptx, December 2019) or in "Coordinated Spatial Reuse Procedure", Internet document IEEE 802.11-20/0410r0 (URL: https://mentor.ieee.org/802.11/dcn/20/11-20-0410-00-00be-coordinated-spatial-reuse-procedure.pptx, March 2020).

Figure 1A:
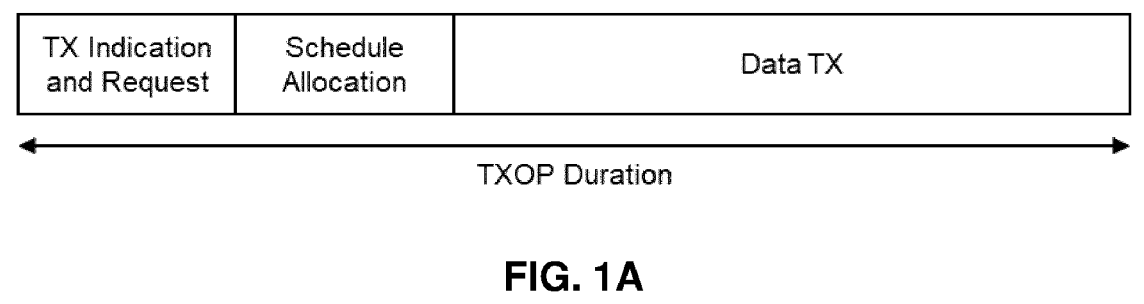

FIG. 1B illustrates further details of the first phase, assuming a scenario with four APs, denoted as AP1, AP2, AP3, and AP4. In the example of FIG. 1B, the TXOP owner, i.e., AP1 first sends a CTI (CAP TXOP Indication) message, and the APs willing to participate in the sharing of the TXOP, i.e., AP2, AP3, and AP4, respond with a CTR (CAP TXOP Request) message. By means of the CTI message, AP1 notifies the other APs that it has obtained the TXOP and is willing to share it. By means of the CTR, AP2, AP3, and AP4 notify AP1 that they are willing to participate in the sharing of the TXOP.

FIG. 1C illustrates further details of the second phase, again assuming a scenario with four APs, denoted as AP1, AP2, AP3, and AP4. In the example of FIG. 1C, the TXOP owner, i.e., AP1, informs the participating APs, i.e., AP2, AP3, AP3, about their allocated resources and the TX start time. This is accomplished by sending a CTAS (CAP TXOP AP Schedule) message and the participating APs inform their associated stations about their respectively allocated resources according to local scheduling within the BSS of the participating AP. This is accomplished by sending a CTLS (CAP TXOP Local Schedule) message.

The existing TXOP sharing mechanisms may however in some cases provide unsatisfactory results concerning protection from interference. For example, there may be insufficient protection from the so-called hidden node problem or from the so-called exposed node problem. This may be attributed to the TXOP being shared among APs that might not be collocated.

The above-mentioned document entitled "Coordinated AP Time/Frequency Sharing in a Transmit Opportunity in 11be" mentions that the CTI-CTR exchange could be used for TXOP protection. While this could achieve some protection for the APs from the hidden node problem, there would still be no protection for the STAs. This illustrated by an example as shown in FIGS. 2A and 2B. In this example, AP1, AP2, and AP3 are assumed to be part of a set of APs sharing a TXOP. AP1 is assumed to just have won a TXOP, and offers to share this TXOP with AP2 and AP3, however without being aware of a further AP, denoted AP4, whose BSS partially overlaps with the BSS of AP3.

FIG. 2B illustrates a possible message exchange in the scenario of FIG. 2A. Based on the CTI message from AP1 and the CTR messages from AP2 and AP3, the TXOP is protected from interference by device that lies within the range of the cooperating APs, i.e., AP1, AP2, and AP3, such as STA31 and STA32. However, it is not protected from interfering devices outside the range of the cooperating APs, such as AP4 and STA41 in the scenario of FIG. 2A.

Accordingly, there is a need for techniques which allow for improved sharing of a TXOP, e.g., with respect to enhanced protection of interference from devices located outside the range of the cooperating APs.

SUMMARY

According to an embodiment, a method of controlling wireless transmissions in a wireless communication system is provided. According to the method, an AP of the wireless communication system configures a carrier for communication with one or more wireless devices associated with the AP. Further, the AP contends at least with one or more other access points for access to the carrier. Further, the AP cooperates with the one or more further APs by sharing a TXOP. The TXOP is reserved on the carrier by one of the APs, in response to this AP gaining access to the carrier. Before transmitting data in the shared TXOP, the AP performs a Ready-to-Send/Clear-to-Send (RTS/CTS) procedure. Further, the AP coordinates the RTS/CTS procedure with an RTS/CTS procedure respectively performed by each of the one or more further APs sharing the TXOP.

According to a further embodiment, an AP for a wireless communication system is provided. The AP is configured to configure a carrier for communication with one or more wireless devices associated with the AP. Further, the AP is configured to contend at least with one or more other access points for access to the carrier. Further, the AP is configured to cooperate with the one or more further APs by sharing a TXOP, reserved on the carrier by one of the APs in response to gaining access to the carrier. Further, the AP is configured to, before transmitting data in the shared TXOP, perform an RTS/CTS procedure. Further, the AP is configured to coordinate the RTS/CTS procedure with an RTS/CTS procedure respectively performed by each of the one or more other APs sharing the TXOP.

According to a further embodiment, an AP for a wireless communication system is provided. The AP comprises at least one processor and a memory. The memory contains instructions executable by said at least one processor, whereby the AP is operative to configure a carrier for communication with one or more wireless devices associated with the AP. Further, the memory contains instructions executable by said at least one processor, whereby the AP is operative to contend at least with one or more other access points for access to the carrier. Further, the memory contains instructions executable by said at least one processor, whereby the AP is operative to cooperate with the one or more further APs by sharing a TXOP, reserved on the carrier by one of the APs in response to gaining access to the carrier. Further, the memory contains instructions executable by said at least one processor, whereby the AP is operative to, before transmitting data in the shared TXOP, perform an RTS/CTS procedure. Further, the memory contains instructions executable by said at least one processor, whereby the AP is operative to coordinate the RTS/CTS procedure with an RTS/CTS procedure respectively performed by each of the one or more further APs sharing the TXOP.

According to a further embodiment, a system is provided. The system comprises multiple APs. Each of the APs is configured to: configure a carrier for communication with one or more wireless devices associated with the AP; contend at least with one or more other access points for access to the carrier; cooperate with the one or more other APs by sharing a TXOP reserved on the carrier by one of the APs in response to gaining access to the carrier; before transmitting data in the shared TXOP, perform an RTS/CTS procedure; and coordinate the RTS/CTS procedure with an RTS/CTS procedure respectively performed by each of the one or more other APs sharing the TXOP.

According to a further embodiment of the invention, a computer program or computer program product is provided, e.g., in the form of a non-transitory storage medium, which comprises program code to be executed by at least one processor of an AP for a wireless communication system. Execution of the program code causes the AP to configure a carrier for communication with one or more wireless devices associated with the AP. Further, execution of the program code causes the AP to contend at least with one or more other access points for access to the carrier. Further, execution of the program code causes the AP to cooperate with the one or more further APs by sharing a TXOP, reserved on the carrier by one of the APs in response to gaining access to the carrier. Further, execution of the program code causes the AP to, before transmitting at least data in the shared TXOP, perform an RTS/CTS procedure. Further, execution of the program code causes the AP to coordinate the RTS/CTS procedure with an RTS/CTS procedure respectively performed by each of the one or more other APs sharing the TXOP.

Details of such embodiments and further embodiments will be apparent from the following detailed description of embodiments.

BRIEF DESCRIPTION OF THE DRAWINGS

FIGS. 1A, 1B, and 1C schematically illustrates an example of a procedure for sharing of a TXOP by multiple APs.

FIGS. 2A and 2B show examples for illustrating potential interference problems in existing TXOP sharing mechanisms.

FIGS. 4A and 4B schematically illustrates examples of RTS/CTS procedures which can be used in embodiments.

FIG. 5 shows an example of processes for TXOP sharing according to an embodiment.

FIG. 7 shows a further example of processes for TXOP sharing according to an embodiment.

FIG. 8 shows a further example of processes for TXOP sharing according to an embodiment.

DETAILED DESCRIPTION OF EMBODIMENTS

In the following, concepts in accordance with exemplary embodiments of the invention will be explained in more detail and with reference to the accompanying drawings. The illustrated embodiments relate to controlling of wireless transmissions in a wireless communication system. The wireless communication system may be a WLAN (Wireless Local Area Network) system based on a IEEE 802.11 technology. However, it is noted that the illustrated concepts could also be applied to other wireless communication technologies, e.g., to contention-based modes of the LTE (Long Term Evolution) or NR (New Radio) technology specified by 3GPP ($3^{rd}$ Generation Partnership Project).

Figure 3:
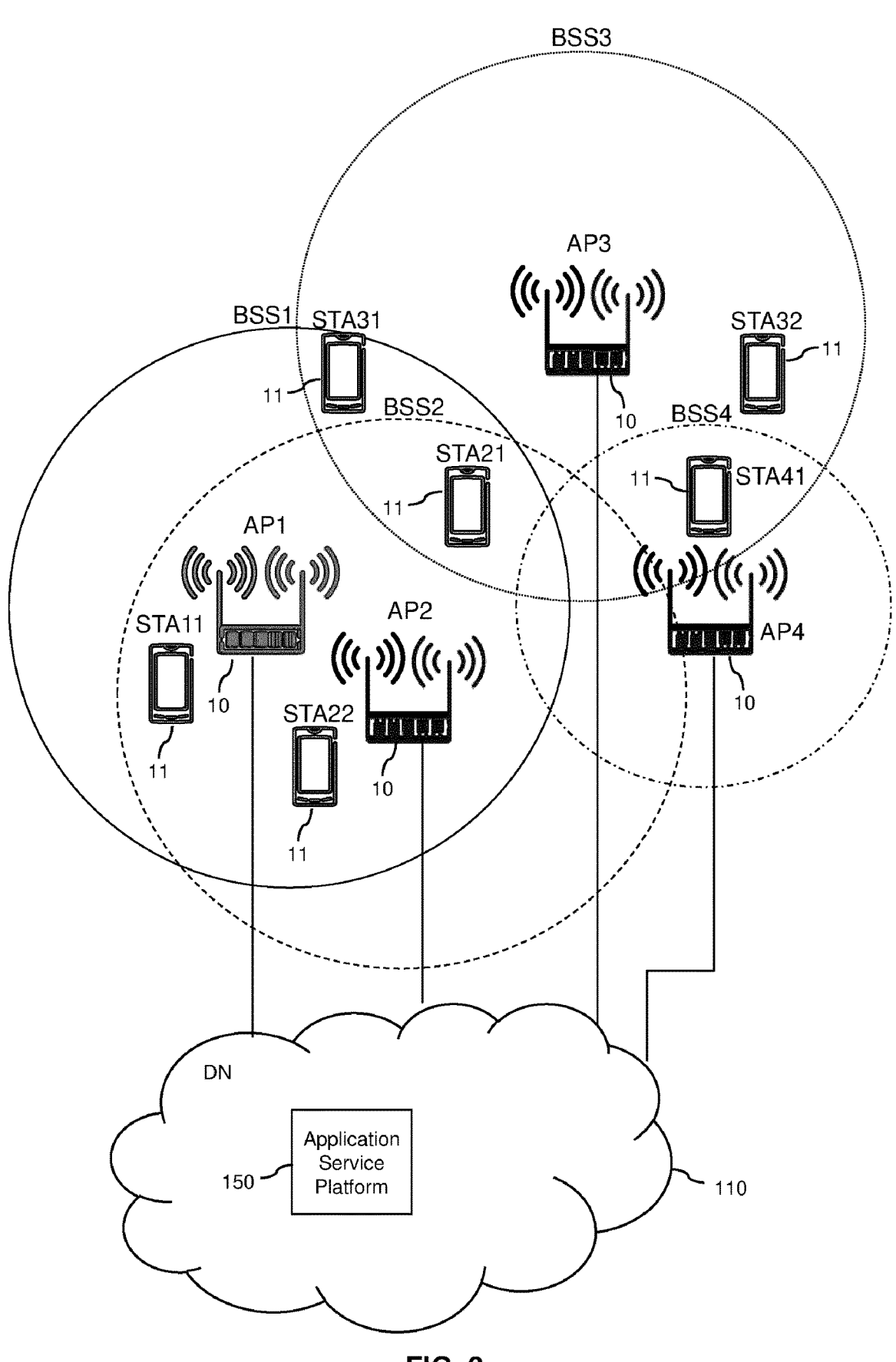
FIG. 3 schematically illustrates a wireless communication system according to an embodiment.

FIG. 3 illustrates an exemplary wireless communication system according to an embodiment. In the illustrated example, the wireless communication system includes multiple access points (APs) 10, in the illustrated example referred to as AP1, AP2, AP3, AP4, and multiple stations (STAs) 11, in the illustrated example referred to as STA11, STA21, STA22, STA31, STA32, and STA41. The station STA11 is served by AP1 (in a first BSS denoted as BSS1), the stations STA21 and STA22 are served by AP2 (in a second BSS denoted as BSS2). The stations STA31 and STA32 are served by AP3 (in a third BSS denoted as BSS3). The station STA41 is served by AP4 (in a fourth BSS denoted as BSS4).The stations 11 may correspond to various kinds of wireless devices, for example user terminals, such as mobile or stationary computing devices like smartphones, laptop computers, desktop computers, tablet computers, gaming devices, or the like. Further, the stations 11 could for example correspond to other kinds of equipment like smart home devices, printers, multimedia devices, data storage devices, or the like.

In the example of FIG. 3, each of the stations 11 may connect through a radio link to one of the APs 10. For example depending on location or channel conditions experienced by a given station 11, the station 11 may select an appropriate AP 10 and BSS for establishing the radio link. The radio link may be based on one or more OFDM carriers from a frequency spectrum which is shared on the basis of a contention based mechanism, e.g., an unlicensed band like the 2.4 GHz ISM band, the 5 GHz band, the 6 GHz band, or the 60 GHz band.

Each AP 10 may provide data connectivity of the stations 11 connected to the AP 10. As further illustrated, the APs 10 may be connected to a data network (DN) 110. In this way, the APs 10 may also provide data connectivity of stations 11 connected to different APs 10. Further, the APs 10 may also provide data connectivity of the stations 11 to other entities, e.g., to one or more servers, service providers, data sources, data sinks, user terminals, or the like. Accordingly, the radio link established between a given station 11 and its serving AP 10 may be used for providing various kinds of services to the station 11, e.g., a voice service, a multimedia service, or other data service. Such services may be based on applications which are executed on the station 11 and/or on a device linked to the station 11. By way of example, FIG. 3 illustrates an application service platform 150 provided in the DN 110. The application(s) executed on the station 11 and/or on one or more other devices linked to the station 11 may use the radio link for data communication with one or more other stations 11 and/or the application service platform 150, thereby enabling utilization of the corresponding service(s) at the station 11.

To achieve high performance in a scenario like illustrated in FIG. 3, coordination between the cells or BSSs may be utilized. In the illustrated examples, the involved APs 10 are assumed to contend for and share common resources. In particular, two or more of the APs 10 may contend for the same wireless medium or radio channel in order to obtain a TXOP. Then, the winning AP 10 can share the resources with the other contending APs in a dynamic fashion. For example, it can share the resources differently in different TXOPs. The wireless medium or radio channel may be based on one or more carriers, e.g., OFDM carriers. Accordingly, in the present disclosure the term carrier may correspond to or be equivalent to a wireless medium or a radio channel.

The illustrated concepts are based on each of the APs 10 sharing the TXOP performing an RTS/CTS procedure before utilizing the shared TXOP to transmit data to their respectively associated stations. Here, the RTS/CTS procedure involves that the AP transmits an RTS message to the station(s) 11 intended as destination of the data transmission and, in response to the RTS message, receives a CTS message from the station(s). These messages can be overheard by potential interfering devices and cause these devices to refrain from transmitting during the intended data transmission. The RTS/CTS procedures performed by the individual cooperating APs are coordinated, in particular with respect to the timing and resources used for the RTS and/or CTS messages. As a result, protection of the shared TXOP from interference can be improved, while at the same time ensuring efficient usage of the shared TXOP.

Figure 4A:
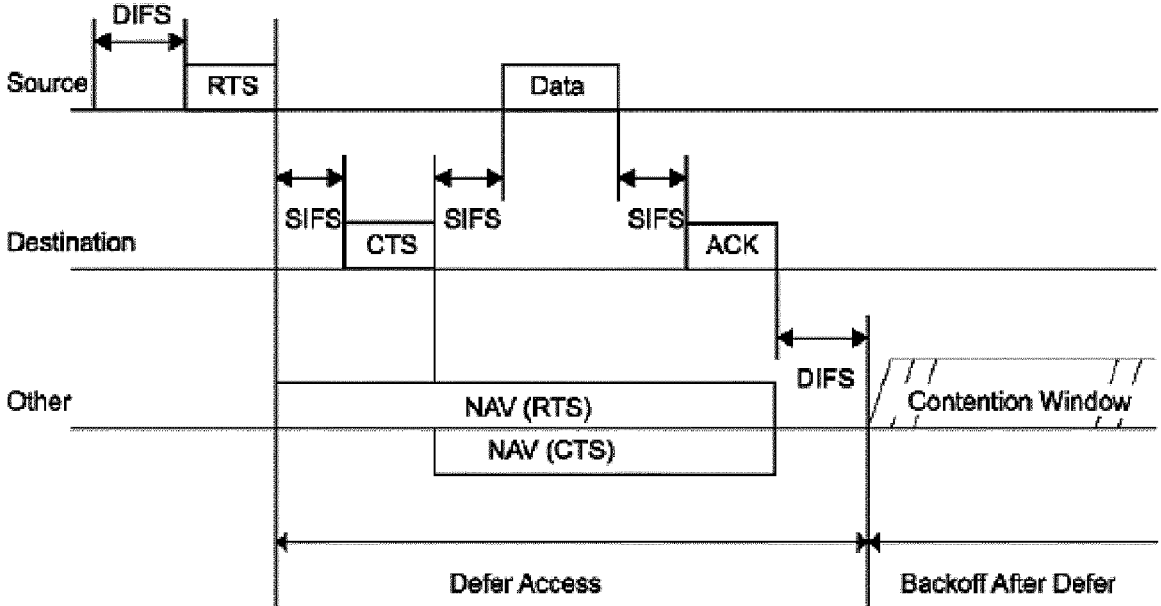

Details of the RTS/CTS procedure may for example correspond to the RTS/CTS procedure as defined in the IEEE 802.11 PHY Specifications. FIG. 4A further illustrates the RTS/CTS procedure as defined in the IEEE 802.11 PHY Specifications.

As illustrated in FIG. 4A, the RTS/CTS procedure is a two-way message exchange were a source, in the illustrated concepts the AP, transmits an RTS message to its destination, in the illustrated concepts the destination station(s) 11. After SIFS (Short Interframe Space) time has passed, the destination then answers with a CTS message. The RTS message and the CTS message contain the remaining duration needed for the intended data transmission. This duration then sets a NAV (Network Allocation Vector) at any device that can decode the message as part of virtual carrier sensing performed by this device. Thus, the RTS/CTS procedure ensures that any devices that are in range will defer from transmitting for the duration of the data transmission.

Figure 4B:
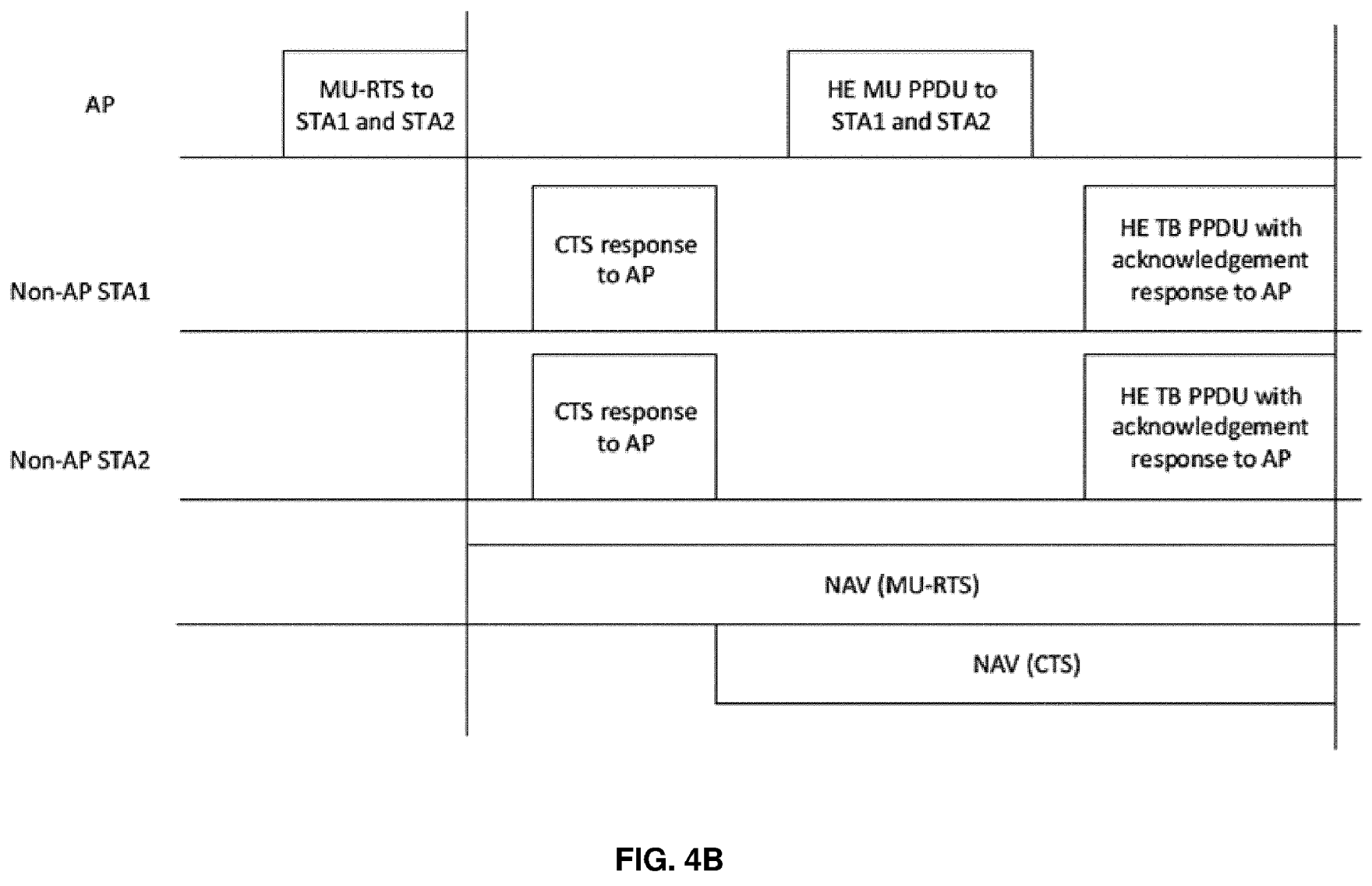

In some scenarios, the RTS/CTS procedure may also be implemented as a multi-user RTS/CTS procedure (MU-RTS/CTS procedure). In such MU-RTS/CTS procedure, a single RTS message is addressed to multiple destinations. For example, the MU-RTS procedure may correspond to the MU-RTS/CTS procedure as defined in IEEE 802.11ax technology, see IEEE P802.11ax™/D6.0 Draft Standard for Information technology—Tele-communications and information exchange between systems Local and metropolitan area networks—Specific requirements Part 11: Wireless LAN Medium Access Control (MAC) and Physical Layer (PHY) Specifications Amendment 1: Enhancements for High Efficiency WLAN (November 2019), in the following denoted as "IEEE 802.11ax Draft". FIG. 4B further illustrates the MU-RTS/CTS procedure as defined in the IEEE 802.11ax Draft. In this MU-RTS procedure, the RTS message is a MU-RTS message that indicates the addresses of each destination and also frequency resources for each destination. As further illustrated, the CTS messages are sent simultaneously from all the destinations as non-HT (non-high throughput) frames or non-HT duplicate frames, using OFDMA based multiplexing.

In the illustrated concepts, the coordination of the individual RTS/CTS procedures allows for defining a cross-BSS RTS/CTS procedure. The cross-BSS RTS/CTS procedure may be implemented as follows:

1. An indication message is sent from the TXOP owner (which may also be referred to as Sharing AP), to the respective participating APs (which may also be referred to as Shared APs), to indicate that a cross-BSS RTS/CTS procedure shall be performed. The indication message may further indicate the duration of the TXOP minus the length of the indication message, i.e., a remaining duration of the TXOP.

2. The participating APs transmit RTS messages. As mentioned above, in some scenarios the RTS messages may be MU-RTS messages. If the sharing of the TXOP is based on OFDMA or on spatial multiplexing, the RTS messages may be transmitted simultaneously. If the sharing of the TXOP is based on TDMA, the RTS messages may be transmitted in a time-sequential manner. The indication message may be used for coordination by controlling the respectively utilized resources to avoid collisions and waste of available resources. The RTS messages may further indicate the remaining duration indicated by the indication message minus the length of the RTS message and, if provided, SIFS. As a result, the RTS messages may each indicate the remaining duration of the TXOP.

3. The destination stations of the RTS frames each respond with a CTS message. The CTS message indicates the remaining duration indicated by the RTS message minus the length of the CTS message and, if provided, the SIFS.

4. Any device that can receive and decode one of the RTS messages or CTS messages will then react by updating its inter- or intra-BSS NAV according to the duration carried by this message, e.g., as specified in the IEEE 802.11 PHY Specifications.

Figure 1B:
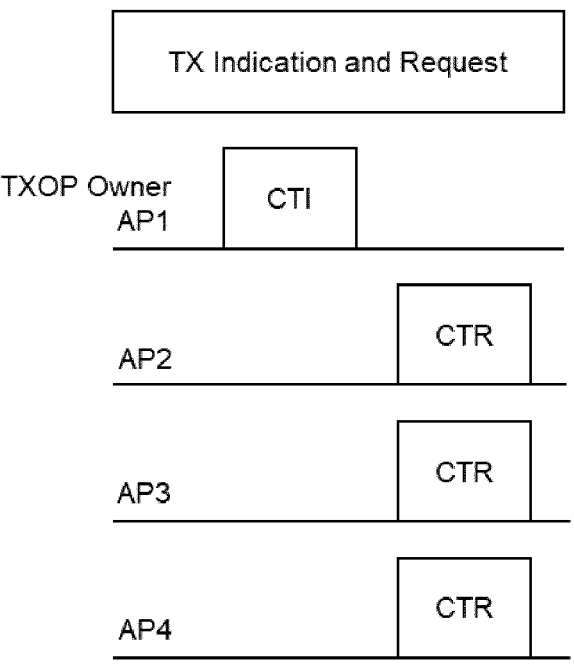
Figure 1C:
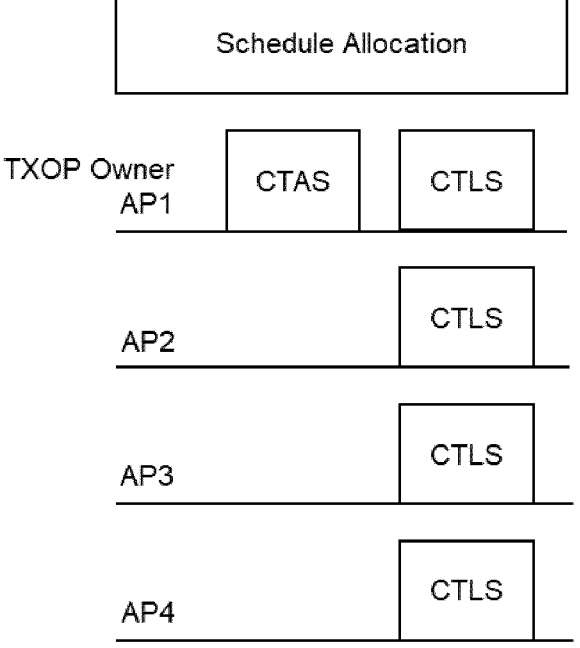
Figure 2A:
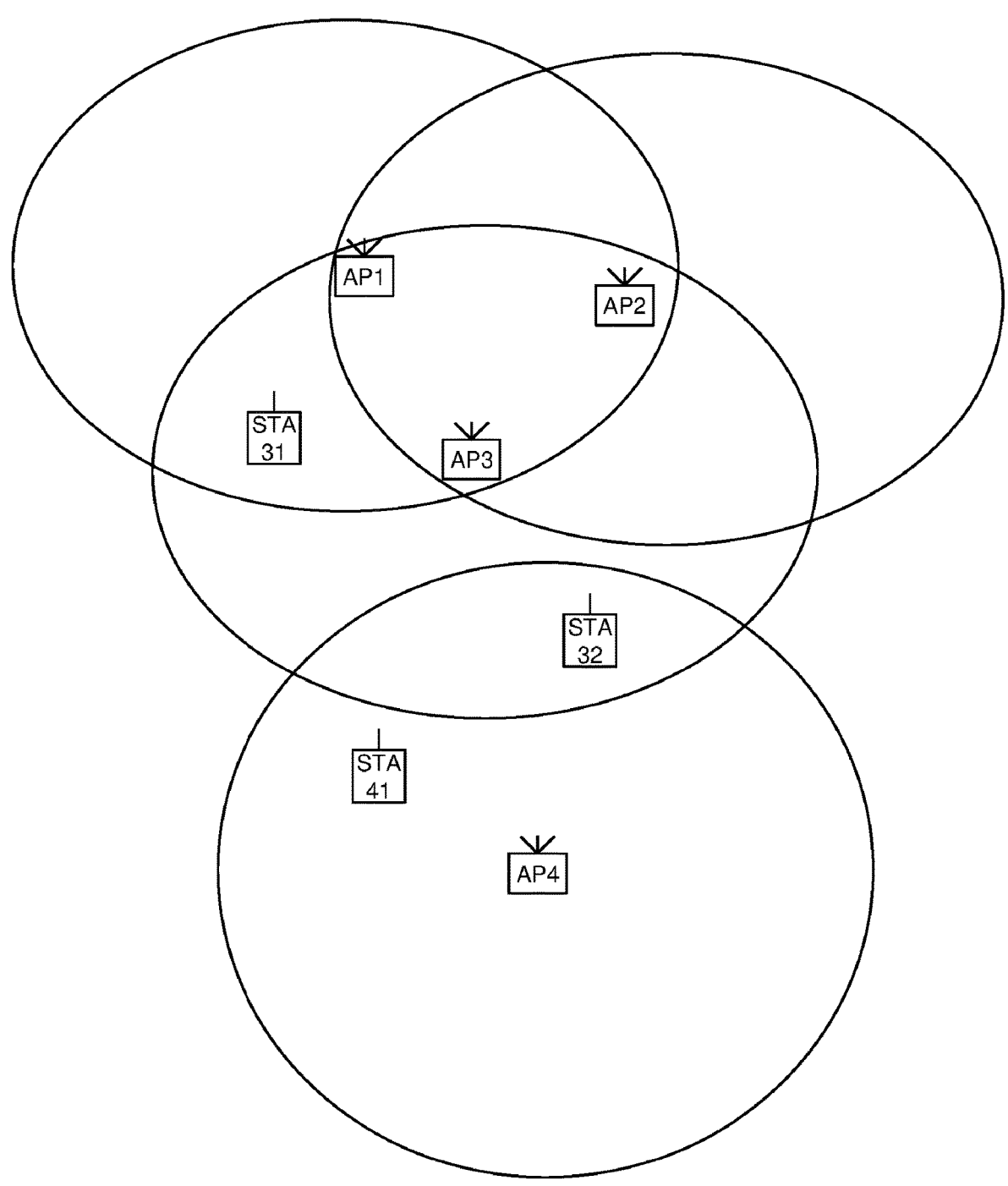
Figure 2B:
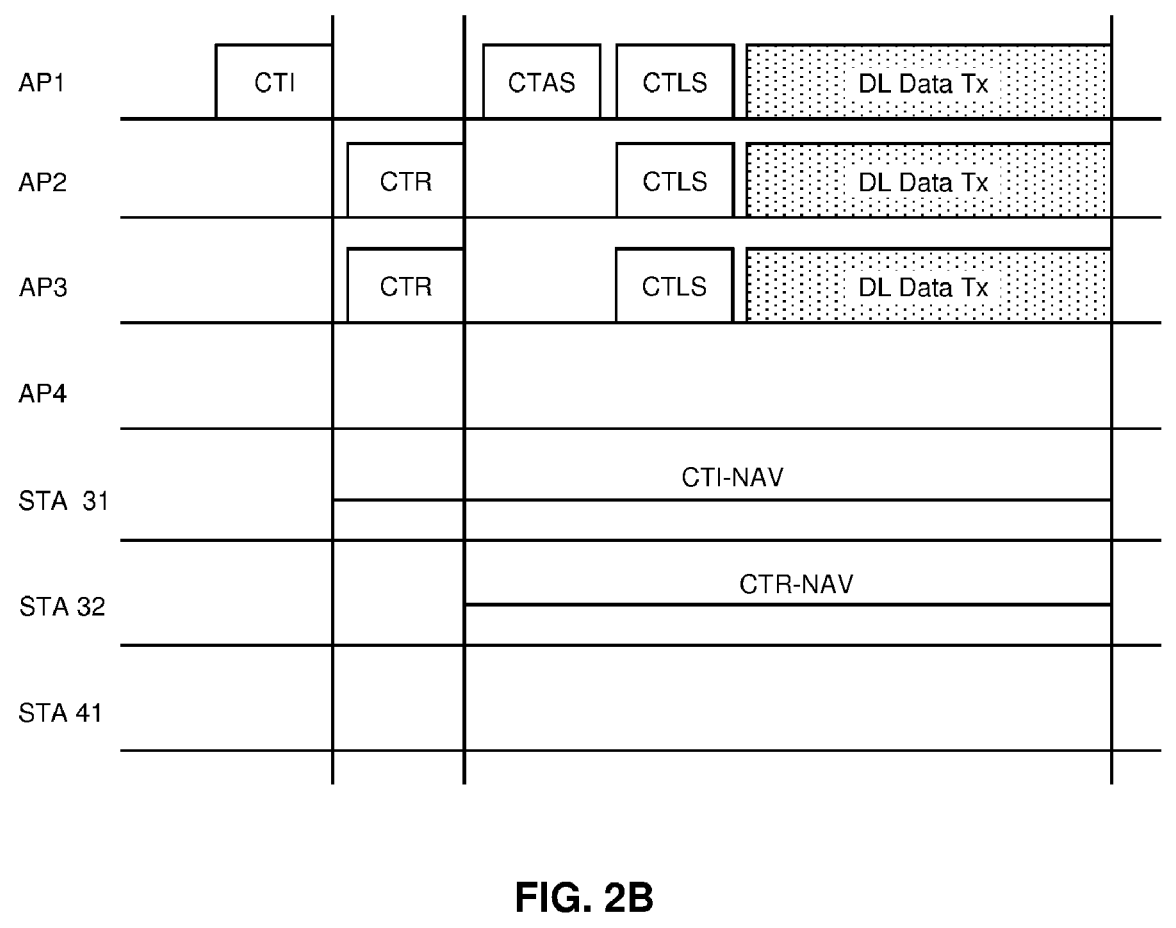
Figure 5:
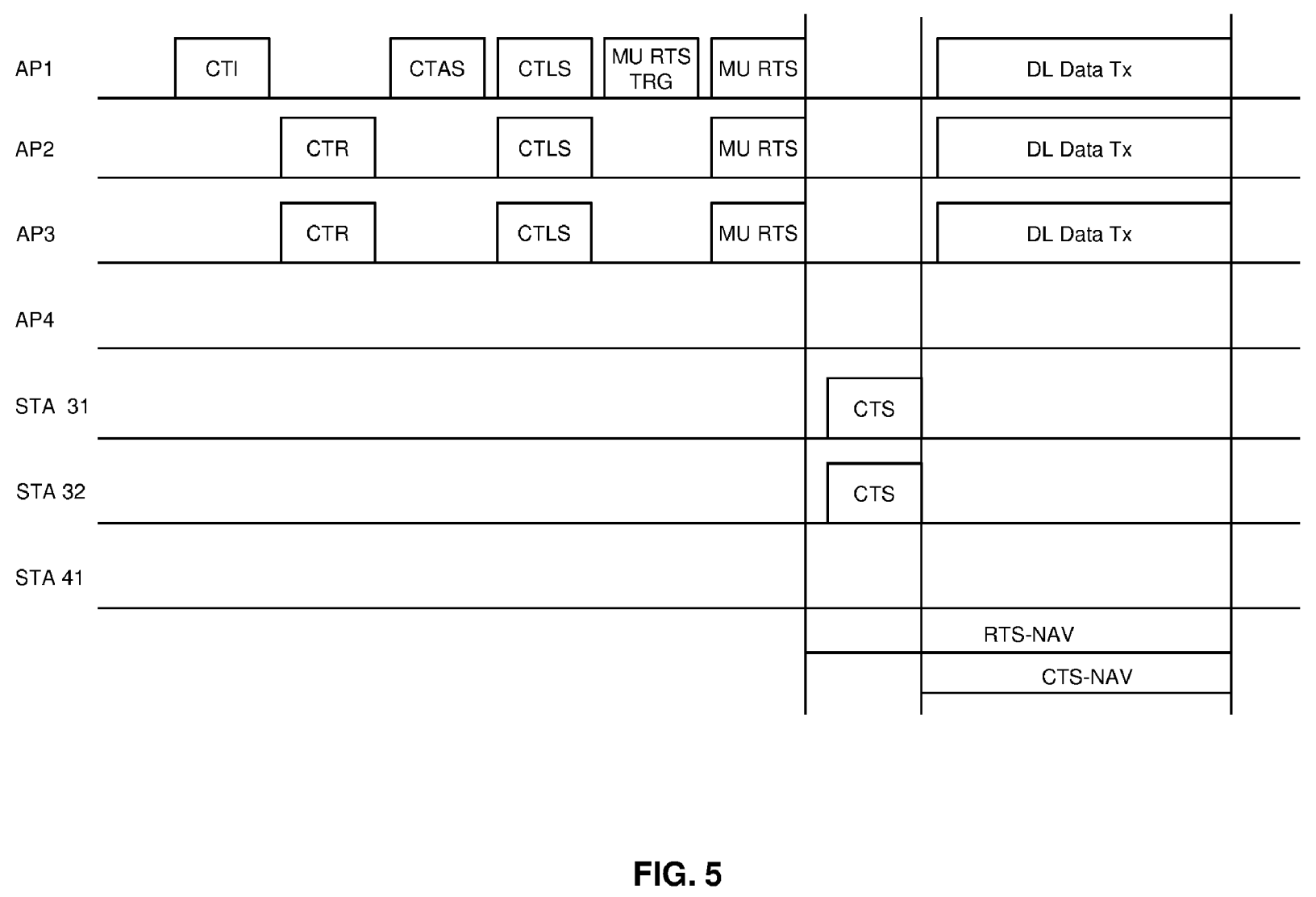

FIG. 5 further illustrates an example of processes implementing the illustrated concepts. In this example, the coordination of the RTS/CTS procedures is performed after the first phase and the second phase of the TXOP sharing process, i.e., after transmitting the CTAS message and the CTLS messages. transmission of the CTI by the TXOP owner and after transmission of the CTR by each of the participating APs. The example assumes a scenario like illustrated in FIG. 2A or in FIG. 3, in which AP1, AP2, and AP3 are part of a set of APs sharing the TXOP, AP1 is the TXOP owner, and AP4 is an additional nearby AP not participating in the TXOP sharing and having a BSS that partially overlaps with the BSS of AP3. Further, the example of FIG. 5 assumes that the sharing of the TXOP is based on OFDMA or spatial multiplexing, e.g., MU-MIMO, to multiplex simultaneous transmissions by different devices.

In the example of FIG. 5, AP1 gains access to the carrier and sends a CTI message to offer sharing of a TXOP. The CTI message at the same time reserves the TXOP. AP2 and AP3 receive the CTI message and each respond with a respective CTR message, thereby indicating that they participate in the sharing of the TXOP. AP1, as the TXOP owner, then sends a CTAS message to AP2 and AP3 to assign resources of the TXOP to AP2 and AP3. Then AP1, AP2, and AP3 each send a respective CTLS message to the associated stations they intend to transmit to in the shared TXOP. At this stage, it is thus clear which devices will participate in the transmission of data during the shared TXOP.

To coordinate the RTS/CTS procedures to be performed by each of the cooperating APs, AP1 then sends a trigger (TRG) message to AP2 and AP3. In the example of FIG. 5, the trigger message causes AP2 and AP3 to send each a respective MU-RTS message. In view of this functionality, the trigger message is denoted as MU-RTS TRG message.

In the example of FIG. 5, the trigger message is used to synchronize the MU-RTS messages transmitted by AP2 and AP3 with a MU-RTS message sent by AP1. The respective MU-RTS messages are multiplexed using OFDMA, by using different (orthogonal) parts of the available bandwidth for each of the MU-RTS messages or by using different spatial channels for each of the MU-RTS messages. These different parts of the bandwidth and/or different spatial channels may be indicated by the trigger message. The MU-RTS messages each indicate the remaining duration of the TXOP, accounting for the time that has expired while transmitting the CTI message, the CTR messages, the CTAS message, the CTLS messages, and the MU-RTS TRG message.

Upon receiving the MU-RTS message, the respective destination station, in the illustrated example the stations STA31 and STA32, responds with a CTS message. The station associated with AP4, i.e., STA41, is assumed to receive the MU-RTS message from AP3 and the CTS message from STA32. Reception of the MU-RTS message from AP3 causes STA41 to set its intra-BSS NAV for the remaining duration of the TXOP, in FIG. 5 illustrated by "RTS-NAV". Similarly, reception of the CTS message from STA32 causes STA41 to set its intra-BSS NAV for the remaining duration of the TXOP, in FIG. 5 illustrated by "CTS-NAV". As a result, STA41 is prevented from transmitting during the shared TXOP and interference on the transmission of DL data by AP1, AP2, and AP3 can be avoided.

Figure 6A:
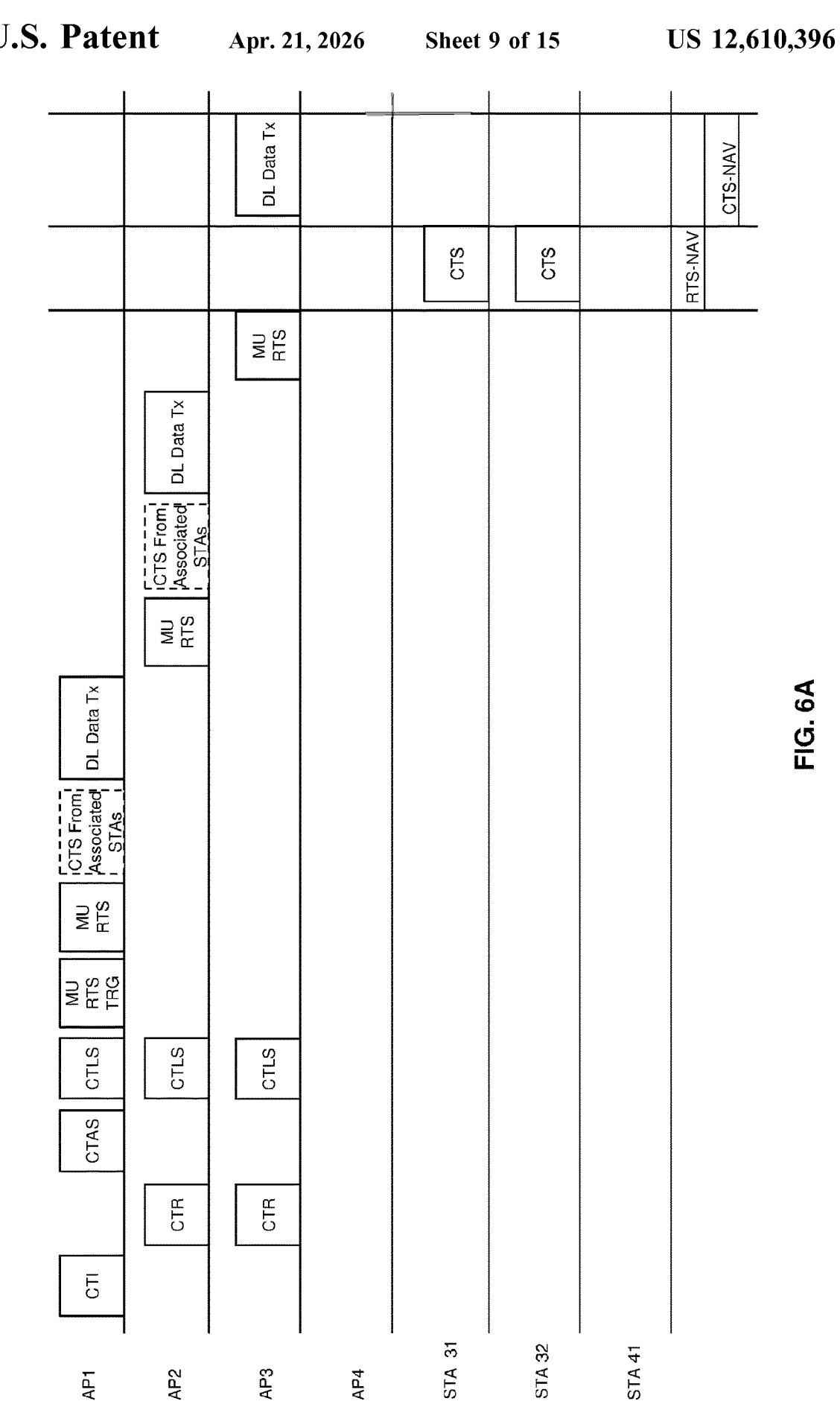
FIGS. 6A and 6B show a further examples of processes for TXOP sharing according to an embodiment.
Figure 6B:
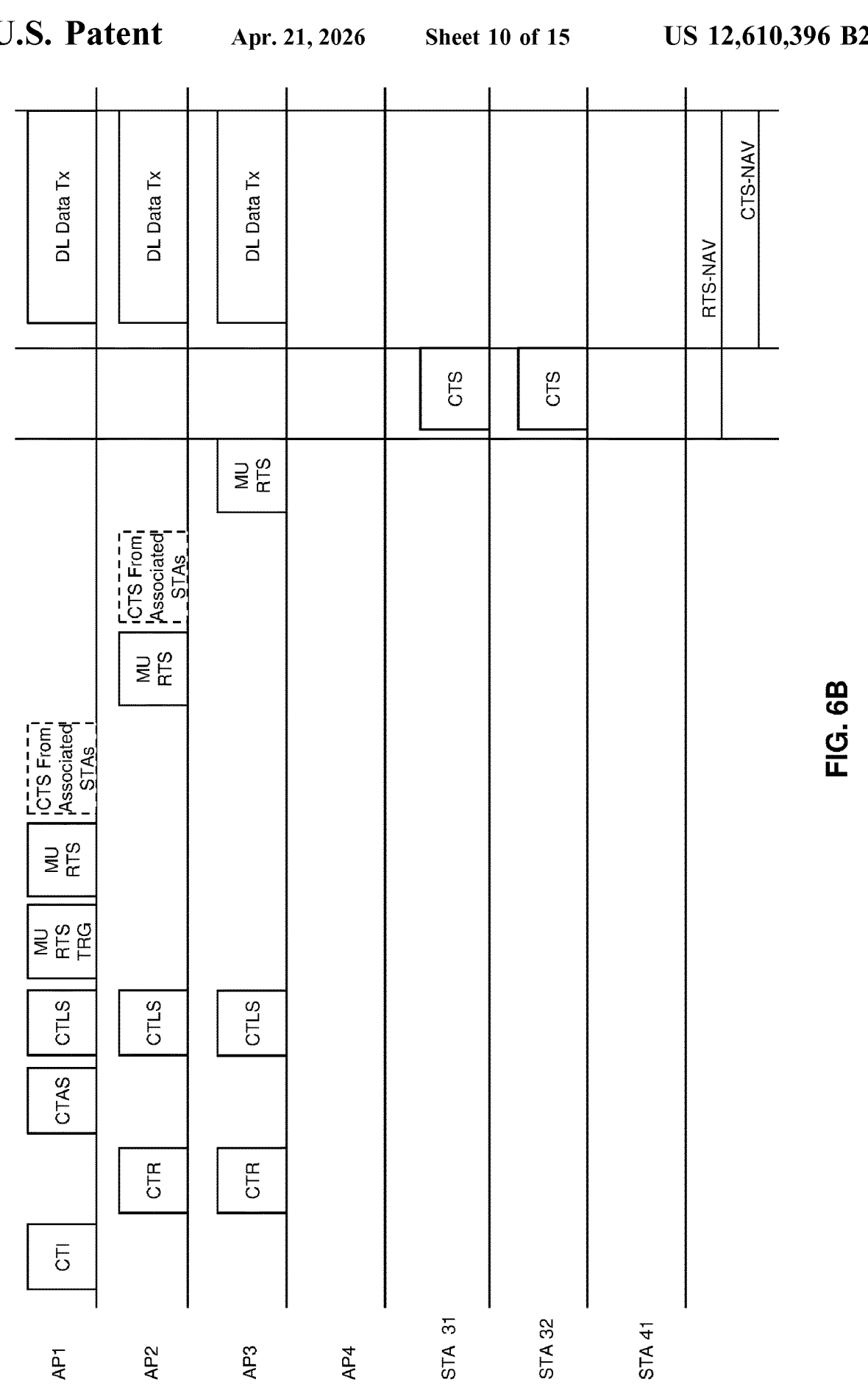

In some scenarios, the sharing of the TXOP can also at least in part be based on TDMA. FIGS. 6A and 6B illustrate corresponding examples of processes implementing the illustrated concepts. Similar to the example of FIG. 5, the coordination of the RTS/CTS procedures is performed after the first phase and the second phase of the TXOP sharing process, i.e., after transmitting the CTAS message and the CTLS messages. transmission of the CTI by the TXOP owner and after transmission of the CTR by each of the participating APs. Further, also the examples of FIGS. 6A and 6B assumes a scenario like illustrated in FIG. 2A or in FIG. 3, in which AP1, AP2, and AP3 are part of a set of APs sharing the TXOP, AP1 is the TXOP owner, and AP4 is an additional nearby AP not participating in the TXOP sharing and having a BSS that partially overlaps with the BSS of AP3.

Similar to the example of FIG. 5, in the examples of FIGS. 6A and 6B AP1 gains access to the carrier and sends a CTI message to offer sharing of a TXOP. The CTI message at the same time reserves the TXOP. AP2 and AP3 receive the CTI message and each respond with a respective CTR message, thereby indicating that they participate in the sharing of the TXOP. AP1, as the TXOP owner, then sends a CTAS message to AP2 and AP3 to assign resources of the TXOP to AP2 and AP3. Then AP1, AP2, and AP3 each send a respective CTLS message to the associated stations they intend to transmit to in the shared TXOP.

To coordinate the RTS/CTS procedures to be performed by each of the cooperating APs, AP1 then sends a trigger (TRG) message to AP2 and AP3. In the example of FIG. 5, the trigger message causes AP2 and AP3 to send each a respective MU-RTS message. In view of this functionality, the trigger message is denoted as MU-RTS TRG message. In the examples of FIGS. 6A and 6B the trigger message controls the timing of the respective MU-RTS messages in such a way that they are transmitted in a sequential manner, with each MU-RTS message being transmitted in a different time slot. Further, the trigger message also reserves time slots for transmission of CTS messages in response to the respective MU-RTS messages.

In the example of FIG. 6A, the timing of the individual RTS/CTS procedures is coordinated by dividing the remaining duration of the TXOP after transmission of the trigger message into a sequence of time windows, each being assigned to one of the cooperating APs. The respective RTS/CTS procedure is performed at the beginning of the respective time window, and the transmission of the DL data is performed in the remaining part of the time window. Accordingly, in a first time window assigned to AP1, AP1 sends its MU-RTS message, then receives the CTS messages transmitted in response, and then transmits its DL data. In a second time window, AP2 sends its MU-RTS message, then receives the CTS messages transmitted in response, and then transmits its DL data. In a third time window, AP3 sends its MU-RTS message, then receives the CTS messages transmitted in response, and then transmits its DL data. Here, it is noted that for the sake of a better overview FIG. 6A illustrates the transmission of the CTS messages only for the third time window.

As shown in FIG. 6A, upon receiving the MU-RTS message from AP3, STA31 and STA32 each respond with a CTS message. The station associated with AP4, i.e., STA41, is assumed to receive the MU-RTS message from AP3 and the CTS message from STA32. Reception of the MU-RTS message from AP3 causes STA41 to set its intra-BSS NAV for the remaining duration of the TXOP, in FIG. 5 illustrated by "RTS-NAV". Similarly, reception of the CTS message from STA32 causes STA41 to set its intra-BSS NAV for the remaining duration of the TXOP, in FIG. 5 illustrated by "CTS-NAV". As a result, STA41 is prevented from transmitting during the shared TXOP and interference on the transmission of DL data by AP1, AP2, and AP3 can be avoided.

Also in the example of FIG. 6B, the timing of the individual RTS/CTS procedures is coordinated by dividing a part of the remaining duration of the TXOP after transmission of the trigger message into a sequence of time windows, each being assigned to one of the cooperating APs. The respective RTS/CTS procedure is performed in respective time window, and the transmission of the DL data is performed in the remaining part of the TXOP, again based on TDMA. However, it would also possible that TDMA is only utilized for the coordinated cross-BSS RTS/CTS procedure, while the transmission of the DL data uses multiplexing in the frequency domain, e.g., based on OFDMA, or in the spatial domain, e.g., based on MU-MIMO. Accordingly, in a first time window assigned to AP1, AP1 sends its MU-RTS message, and then receives the CTS messages transmitted in response. In a second time window, AP2 sends its MU-RTS message and then receives the CTS messages transmitted in response. In a third time window, AP3 sends its MU-RTS message and then receives the CTS messages transmitted in response. In the remaining part of the TXOP, AP1, AP2, and AP3 then transmit their respective DL data. Here, it is noted that for the sake of a better overview FIG. 6B does not illustrate the time slots assigned for TDMA based sharing of the remaining part of the TXOP. Similar to FIG. 6A, FIG. 6B illustrates the transmission of the CTS messages only for the third time window.

As shown in FIG. 6B, upon receiving the MU-RTS message from AP3, STA31 and STA32 each respond with a CTS message. The station associated with AP4, i.e., STA41, is assumed to receive the MU-RTS message from AP3 and the CTS message from STA32. Reception of the MU-RTS message from AP3 causes STA41 to set its intra-BSS NAV for the remaining duration of the TXOP, in FIG. 5 illustrated by "RTS-NAV". Similarly, reception of the CTS message from STA32 causes STA41 to set its intra-BSS NAV for the remaining duration of the TXOP, in FIG. 5 illustrated by "CTS-NAV". As a result, STA41 is prevented from transmitting during the shared TXOP and interference on the transmission of DL data by AP1, AP2, and AP3 can be avoided.

In some scenarios, at least one message of the RTS/CTS procedure or a message used for the coordination of the RTS/CTS procedures may be combined with a message for coordinating the sharing of the TXOP. FIGS. 7 and 8 illustrate examples of corresponding processes. Similar to the example of FIG. 5, these examples assume that the sharing of the TXOP is based on OFDMA or spatial multiplexing, e.g., MU-MIMO, to multiplex simultaneous transmissions by different devices. However, it is noted that similar principles concerning the combination of messages may also be applied with respect to TDMA based sharing of the TXOP.

In the example of FIG. 7, AP1 gains access to the carrier and sends a CTI message to offer sharing of a TXOP. The CTI message at the same time reserves the TXOP. AP2 and AP3 receive the CTI message and each respond with a respective CTR message, thereby indicating that they participate in the sharing of the TXOP. AP1, as the TXOP owner, then sends a CTAS message to AP2 and AP3 to assign resources of the TXOP to AP2 and AP3. Then AP1, AP2, and AP3 each send a respective CTLS message to the associated stations they intend to transmit to in the shared TXOP. At this stage, it is thus clear which devices will participate in the transmission of data during the shared TXOP.

In the example of FIG. 7, the CTAS message from the TXOP owner is also used to coordinate the RTS/CTS procedures to be performed by each of the cooperating APs. Specifically, the CTAS message causes AP2 and AP3 to send each a respective MU-RTS message. This is done in such way that the MU-RTS messages transmitted by AP2 and AP3 are synchronized with a MU-RTS message sent by AP1. Accordingly, the CTAS message is combined with a trigger message as used in the example of FIG. 5.

Further, the example of FIG. 7 assumes that the respective MU-RTS messages from AP1, AP2, and AP3 are combined with the respective CTLS message from AP1, AP2, and AP3. Accordingly, the CTLS messages each cause the destination station to respond with a CTS message and indicate the remaining duration of the TXOP, accounting for the time that has expired while transmitting the CTI message, the CTR messages, the CTAS message, and the CTLS messages. Further, the CTLS message also includes the addresses of the respective destination station(s) to which the AP intends to transmit.

Upon receiving the CTLS message, the respective destination station, in the illustrated example the stations STA31 and STA32, responds with a CTS message. The station associated with AP4, i.e., STA41, is assumed to receive the MU-RTS message from AP3 and the CTS message from STA32. Reception of the CTS message from STA32 causes STA41 to set its intra-BSS NAV for the remaining duration of the TXOP, in FIG. 7 illustrated by "CTS-NAV". As further illustrated in FIG. 7, reception of the CTS message from STA32 by AP4 may also cause AP4 to set its intra-BSS NAV for the remaining duration of the TXOP. As a result, STA41 is prevented from transmitting during the shared TXOP and interference on the transmission of DL data by AP1, AP2, and AP3 can be avoided. As compared to the examples of FIGS. 5, 6A, and 6B, this protection may start earlier in the TXOP already after transmission of the CTI message. As further shown, reception of the CTI message from AP1 could also cause STA41 to set its intra-BSS NAV for the remaining duration of the TXOP, in FIG. 7 illustrated by "CTI-NAV", or reception of the CTR message from AP2 or AP3 could also cause STA41 to set its intra-BSS NAV for the remaining duration of the TXOP, in FIG. 7 illustrated by "CTR-NAV", allowing for an even earlier protection if AP41 is in the range of AP1, AP2, or AP3.

In the example of FIG. 8, it is assumed that the TXOP sharing process does not require transmission of the CTR messages. This means that the TXOP owner, in this example AP1, gives away resources of the TXOP without asking the participating APs, i.e., AP2 and AP3, if they have any data to send. In this case, the CTI message and the CTAS message can be combined in a single message.

In the example of FIG. 8, the combined CTI and CTAS message from the TXOP owner is also used to coordinate the RTS/CTS procedures to be performed by each of the cooperating APs. Specifically, the combined CTI and CTAS message causes AP2 and AP3 to send each a respective MU-RTS message. This is done in such way that the MU-RTS messages transmitted by AP2 and AP3 are synchronized with a MU-RTS message sent by AP1. Accordingly, the combined CTI and CTAS message is combined with a trigger message as used in the example of FIG. 5.

Further, the example of FIG. 8 assumes that the respective MU-RTS messages from AP1, AP2, and AP3 are combined with the respective CTLS message from AP1, AP2, and AP3. Accordingly, the CTLS messages each cause the destination station to respond with a CTS message and indicate the remaining duration of the TXOP, accounting for the time that has expired while transmitting the CTI message, the CTR messages, the CTAS message, and the CTLS messages. Further, the CTLS message also includes the addresses of the respective destination station(s) to which the AP intends to transmit.

Upon receiving the CTLS message, the respective destination station, in the illustrated example the stations STA31 and STA32, responds with a CTS message. The station associated with AP4, i.e., STA41, is assumed to receive the MU-RTS message from AP3 and the CTS message from STA32. Reception of the CTS message from STA32 causes STA41 to set its intra-BSS NAV for the remaining duration of the TXOP, in FIG. 7 illustrated by "CTS-NAV". As further illustrated in FIG. 7, reception of the CTS message from STA32 by AP4 may also cause AP4 to set its intra-BSS NAV for the remaining duration of the TXOP. As a result, STA41 is prevented from transmitting during the shared TXOP and interference on the transmission of DL data by AP1, AP2, and AP3 can be avoided. As compared to the examples of FIGS. 5, 6A, and 6B, this protection may start earlier in the TXOP already after transmission of the CTI message. As further shown, reception of the CTI message from AP1 could also cause STA41 to set its intra-BSS NAV for the remaining duration of the TXOP, in FIG. 7 illustrated by "CTI-NAV", or reception of the CTR message from AP2 or AP3 could also cause STA41 to set its intra-BSS NAV for the remaining duration of the TXOP, in FIG. 7 illustrated by "CTR-NAV", allowing for an even earlier protection if AP41 is in the range of AP1, AP2, or AP3.

It is noted that the above examples of combining messages are not limiting and could be modified. For example, it would also be possible to combine the trigger message into the CTAS message or into the combined CTI and CTAS message as explained in connection with FIGS. 7 and 8 and to still transmit the MU-RTS message as a dedicated message, as explained in connection with FIG. 5. Further, the CTS messages may be conventional dedicated CTS messages or could be combined with some additional control information.

Figure 9:
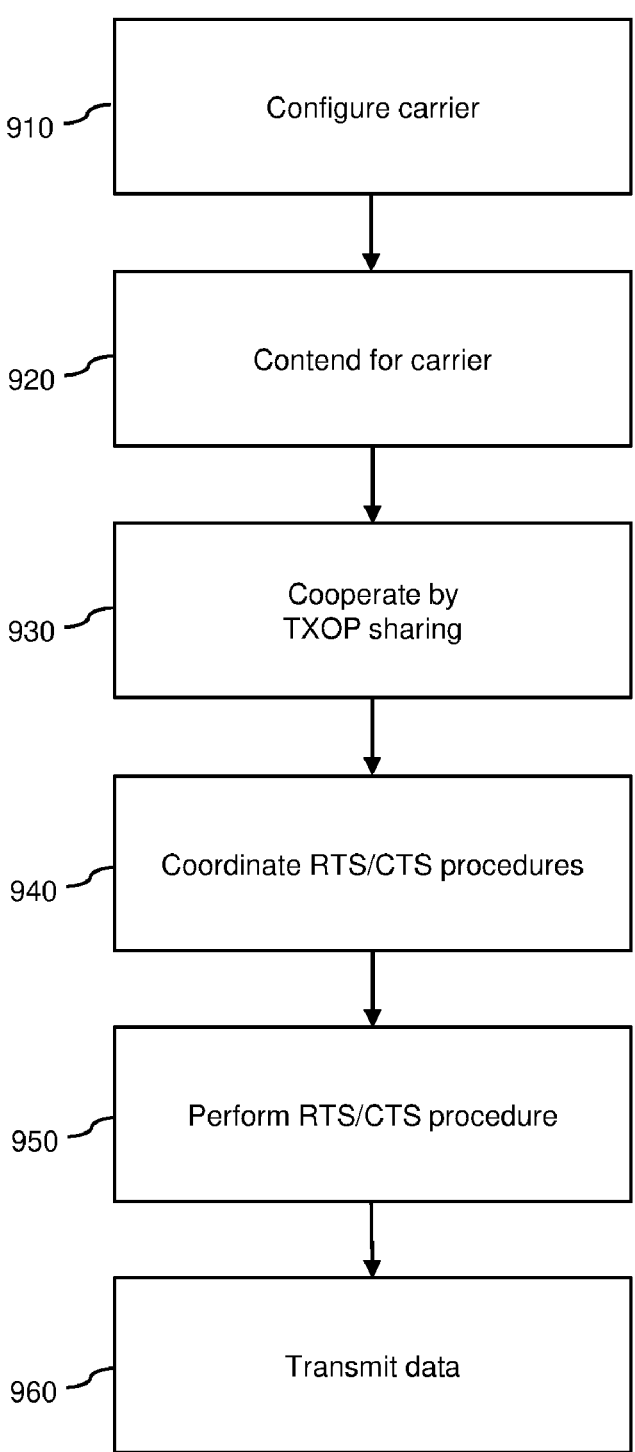
FIG. 9 shows a flowchart for schematically illustrating a method according to an embodiment.

FIG. 9 shows a flowchart for illustrating a method, which may be utilized for implementing the illustrated concepts. The method of FIG. 9 may be used for implementing the illustrated concepts in a network node, in particular an AP for a wireless communication system. The wireless communication system may be based on a wireless local area network, WLAN, technology, e.g., according to the IEEE 802.11 standards family. The AP may for example correspond to any of the above-mentioned APs 10.

If a processor-based implementation of the AP is used, at least some of the steps of the method of FIG. 9 may be performed and/or controlled by one or more processors of the AP. Such AP may also include a memory storing program code for implementing at least some of the below described functionalities or steps of the method of FIG. 9.

At step 910, the AP configures a carrier for communication with one or more wireless devices associated with the AP. The one or more wireless devices may for example correspond to the above-mentioned wireless devices 11. The one or more wireless devices may be stations in a BSS served by the AP.

At step 920, the AP contends at least with one or more other access points for access to the carrier. This may involve performing a CCA (Clear Channel Assessment) or LBT (Listen Before Talk) procedure to assess whether the carrier is occupied. The CCA or LBT procedure may be based on a contention window which is extended with each unsuccessful access attempt. In some scenarios, the AP may win the contention for access to the carrier. In other scenarios, another AP may win the contention for access to the carrier. In each case, the AP winning the contention reserves a TXOP on the carrier. Reserving the TXOP may involve sending the above-mentioned CTI message. Here, it is noted that also other devices may contend for access to the carrier, e.g., non-AP stations or other wireless devices.

At step 930, the AP cooperates with the one or more other APs by sharing the TXOP. The sharing of the TXOP may be based on multiplexing of wireless transmissions on the carrier in the time domain, in the frequency domain, and/or in the spatial domain. In some scenarios, the sharing of the TXOP may also be based on spatial reuse. The sharing of the TXOP may be based on an exchange of messages between the cooperating APs, such as the above-mentioned CTI message, CTR message(s), and CTAS message. Further, the sharing of the TXOP may be based on transmitting a message to the wireless devices associated with the respective cooperating AP, such as the above-mentioned CTLS message.

At step 940, the AP coordinates an RTS/CTS procedure performed by the AP with an RTS/CTS procedure respectively performed by each of the one or more other cooperating APs. The coordination of step 940 may be based on control information transmitted from the AP that reserved the TXOP to the one or more other APs sharing the TXOP. For example, the above-mentioned trigger message could be used for conveying the control information. In some cases, also a message for coordinating the sharing of the TXOP may be used for conveying the control information.

In some scenarios, the control information may control a timing of the RTS/CTS procedure performed by the AP receiving the control information. For example, the control information may synchronize an RTS message transmitted by the AP to the RTS message respectively transmitted by each of the other APs, e.g., like explained in connection with the example of FIG. 5. Further, the control information could assign time slots to the RTS message transmissions by the different APs, e.g., like explained in connection with the examples of FIG. 6A or 6B.

In some scenarios, the control information may also control frequency resources to be used in the RTS/CTS procedure performed by the AP receiving the control information and/or the control information may control spatial resources to be used in the RTS/CTS procedure performed by the AP receiving the control information.

In some scenarios, the control information may indicate a remaining duration of the TXOP.

As mentioned above, a message for coordinating the sharing of the TXOP may be used for conveying the control information. For example, the sharing of the TXOP is based on an invitation to participate in the sharing of the TXOP, such as the above-mentioned CTI message. Such invitation may be transmitted by the AP that reserved the TXOP. As explained in connection with the example of FIG. 8, at least a part the control information may then be transmitted in a message conveying the invitation.

Further, the sharing of the TXOP may be based on scheduling information transmitted from the AP that reserved the TXOP to the one or more other APs sharing the TXOP, such as the above-mentioned CTAS message. As explained in connection with the examples of FIGS. 7 and 8, at least a part the control information may then be transmitted in a message conveying the scheduling information. In some scenarios, as explained in connection with the example of FIG. 8, at least a part the control information may also be transmitted in a message conveying the invitation and the scheduling information.

Further, at least a part the control information may be transmitted in a message dedicated to transmitting the control information, e.g., as explained for the trigger message in the examples of FIGS. 5, 6A, and 6B.

At step 950, the AP performs the RTS/CTS procedure, which is coordinated with the RTS/CTS procedure respectively performed by the one or more other APs sharing the TXOP. Here, it is noted that also each of the other cooperating APs performs its respective RTS/CTS procedures. Based on step 940, these RTS/CTS procedures are coordinated with respect to each other.

The RTS/CTS procedure respectively performed by each of the APs sharing the TXOP may involve transmitting an RTS message by the respective AP. The different RTS messages may be multiplexed in at least one of the time domain, frequency domain and spatial domain. The RTS messages may respectively indicate a remaining duration of the TXOP. In some scenarios, the RTS messages may be MU-RTS messages. As mentioned above, the sharing of the TXOP may be based on local scheduling information respectively transmitted by each of the APs sharing the TXOP, such as the scheduling information conveyed by the above-mentioned CTLS message. The RTS messages and the local scheduling information may then be multiplexed in at least one of the time domain, frequency domain and spatial domain. In some cases, the RTS message transmitted by the respective AP may be combined into the message conveying the scheduling information, such as explained in connection with the examples of FIGS. 7 and 8.

Further, the RTS/CTS procedure performed by the AP may involve receiving a CTS message by the AP. Similarly, the RTS/CTS procedure respectively performed each of the one or more other APs sharing the TXOP may involve receiving a CTS message by the respective AP. The CTS message may indicate a remaining duration of the TXOP.

At step 960, the AP transmits data in the shared TXOP. The transmission of the data may be multiplexed with transmissions by the other APs sharing the TXOP. The multiplexing may be based on multiplexing in the time domain, in the frequency domain, and/or in the spatial domain. In some scenarios, the transmission of the data may also be based on spatial reuse of resources with one or more other APs sharing the TXOP.

Figure 10:
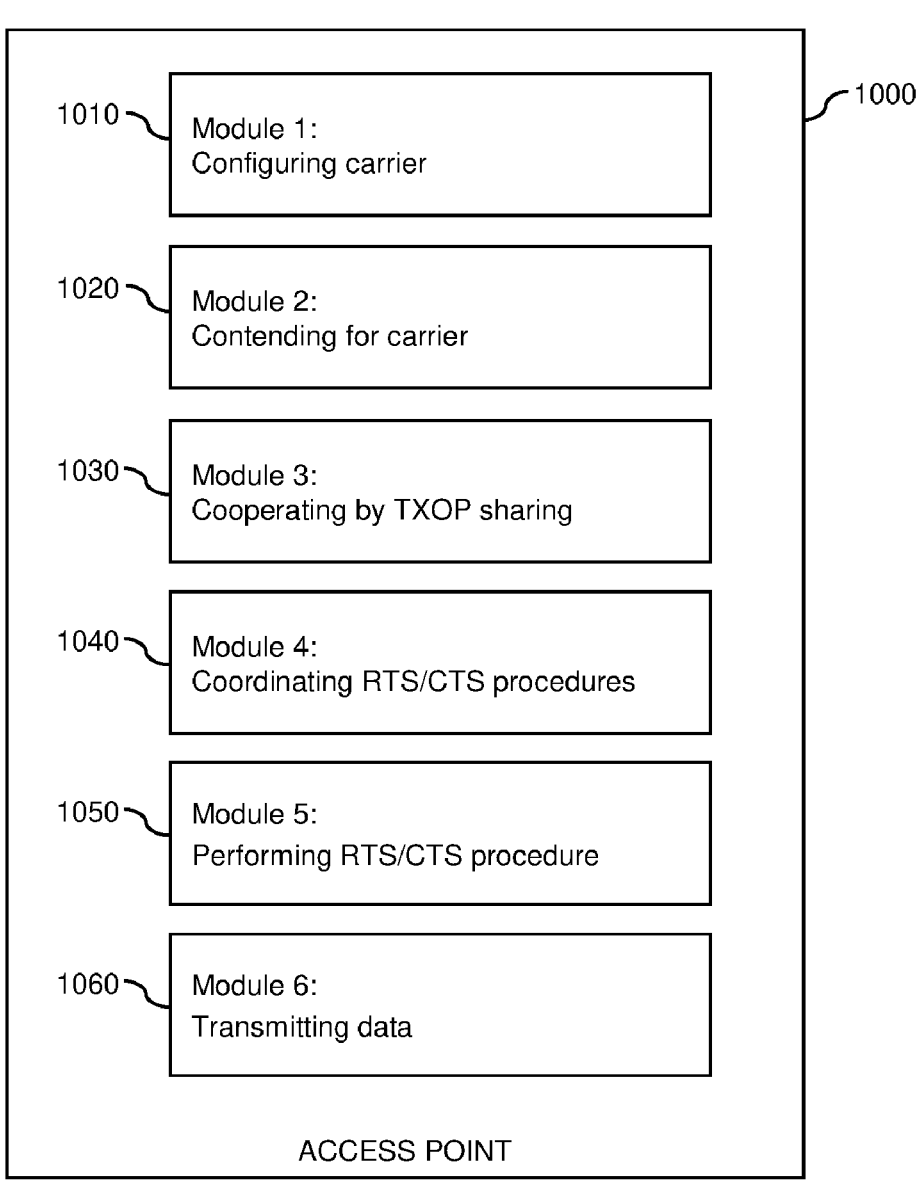
FIG. 10 shows a block diagram for schematically illustrating functionalities of an access point according to an embodiment.

FIG. 10 shows a block diagram for illustrating functionalities of an AP 1000 which operates according to the method of FIG. 8. The AP 1000 may for example correspond to one of above-mentioned APs 10. As illustrated, the AP 1000 may be provided with a module 1010 configured to configure a carrier for communication with one or more wireless devices, such as explained in connection with step 910. Further, the AP 1000 may be provided with a module 1020 configured to contend for the carrier, such as explained in connection with step 920. Further, the AP 1000 may be provided with a module 1030 configured to cooperate with one or more other APs by sharing a TXOP, such as explained in connection with step 930. Further, the AP 1000 may be provided with a module 1040 configured to coordinate RTS/CTS procedures, such as explained in connection with step 940. Further, the AP 1000 may be provided with a module 1050 configured to perform an RTS/CTS procedure, such as explained in connection with step 950. Further, the AP 1000 may be provided with a module 1060 configured to transmit data in the shared TXOP, such as explained in connection with step 960.

It is noted that the AP 1000 may include further modules for implementing other functionalities, such as known functionalities of a WLAN AP. Further, it is noted that the modules of the AP 1000 do not necessarily represent a hardware structure of the AP 1000, but may also correspond to functional elements, e.g., implemented by hardware, software, or a combination thereof.

It is noted that the functionalities as described in connection with FIGS. 9 and 10 could also be implemented in a system including multiple APs. In such system, each AP could operate according to the method of FIG. 9. Further, such system could include one or more wireless devices associated with the APs.

Figure 11:
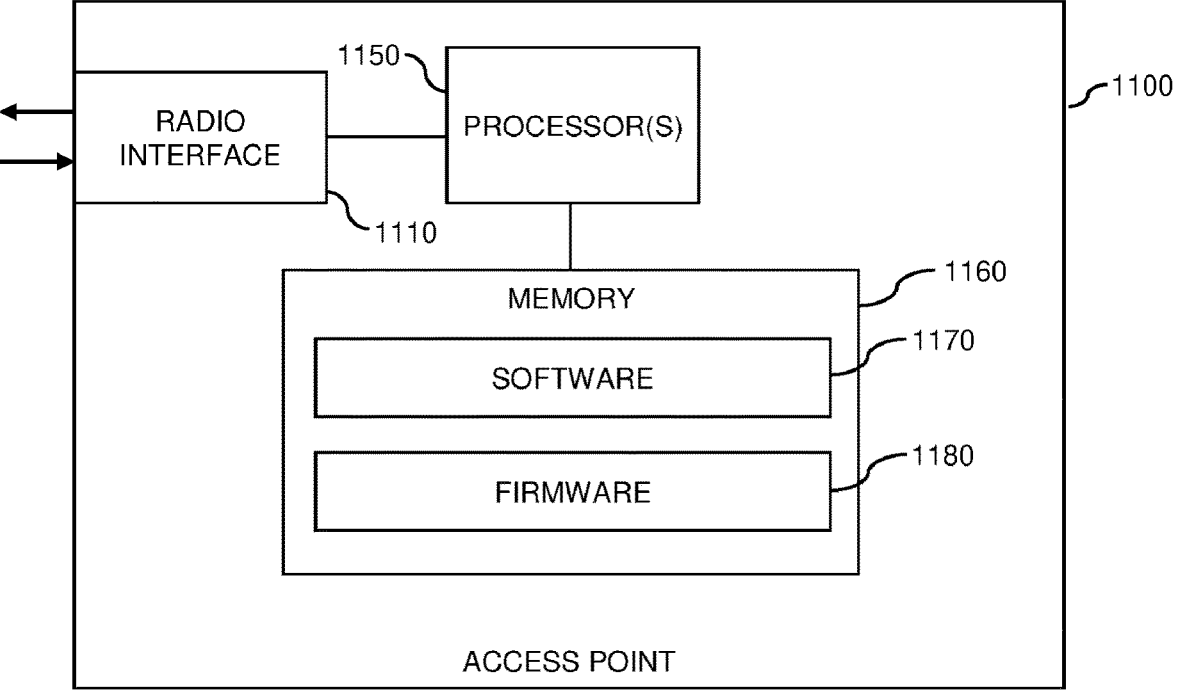
FIG. 11 schematically illustrates structures of an access point according to an embodiment.

FIG. 11 illustrates a processor-based implementation of an AP 1100 which may be used for implementing the above-described concepts. For example, the structures as illustrated in FIG. 11 may be used for implementing the concepts in any of the above-mentioned APs 10.

As illustrated, the AP 1100 includes one or more radio interfaces 1110. The radio interface(s) 1110 may for example be based on a WLAN technology, e.g., according to an IEEE 802.11 family standard. However, other wireless technologies could be supported as well, e.g., the LTE technology or the NR technology. In some scenarios, the radio interface(s) 1110 may be based on multiple antennas of the AP 1100 and support beamformed multi-antenna port transmission to enable spatial multiplexing of wireless transmissions.

Further, the AP 1100 may include one or more processors 1150 coupled to the radio interface(s) 1110 and a memory 1160 coupled to the processor(s) 1150. By way of example, the radio interface(s) 1110, the processor(s) 1150, and the memory 1160 could be coupled by one or more internal bus systems of the AP 1100. The memory 1160 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1160 may include software 1170 and/or firmware 1180. The memory 1160 may include suitably configured program code to be executed by the processor(s) 1150 so as to implement the above-described functionalities for controlling wireless transmissions, such as explained in connection with FIGS. 9 and 10.

It is to be understood that the structures as illustrated in FIG. 11 are merely schematic and that the AP 1100 may actually include further components which, for the sake of clarity, have not been illustrated, e.g., further interfaces or further processors. Also, it is to be understood that the memory 1160 may include further program code for implementing known functionalities of a WLAN AP. According to some embodiments, also a computer program may be provided for implementing functionalities of the AP 1100, e.g., in the form of a physical medium storing the program code and/or other data to be stored in the memory 1160 or by making the program code available for download or by streaming.

As can be seen, the concepts as described above may be used for efficiently controlling sharing of a TXOP by multiple APs. In particular, the concepts may allow for providing enhanced protection with respect to interference from devices not participating in the sharing of the TXOP.

It is to be understood that the examples and embodiments as explained above are merely illustrative and susceptible to various modifications. For example, the illustrated concepts may be applied in connection with various kinds of wireless technologies, without limitation to WLAN technologies. Further, the concepts may be applied with respect to various types of APs and stations. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules.

The invention claimed is:

1. A method of controlling wireless transmissions in a wireless communication system, the method comprising:

an access point of the wireless communication system configuring a carrier for communication with one or more wireless devices associated with the access point;

the access point contending at least with one or more other access points for access to the carrier to transmit data to at least one of the wireless devices associated with the access point;

the access point cooperating with the one or more other access points by sharing a transmission opportunity, TXOP, reserved on the carrier by one of the access points in response to gaining access to the carrier, wherein said sharing of the TXOP is based on an invitation to participate in the sharing of the TXOP, the invitation being transmitted by the access point that gained access to the carrier to reserve the TXOP and to offer sharing of the TXOP;

before transmitting data in the shared TXOP, the access point performing a Ready-to-Send/Clear-to-Send, RTS/CTS, procedure;

the access point coordinating the RTS/CTS procedure with an RTS/CTS procedure respectively performed by each of the one or more other access points sharing the TXOP, wherein the RTS/CTS procedure respectively performed by each of the access points sharing the TXOP comprises transmitting an RTS message by the respective access point, wherein said coordinating the RTS/CTS procedures is based on control information transmitted from the access point that reserved the TXOP to the one or more other access points sharing the TXOP, at least a part the control information being transmitted in a message conveying the invitation to participate in the sharing of the TXOP, wherein the sharing of the TXOP is based on local scheduling information respectively transmitted by each of the access points sharing the TXOP, and wherein the RTS messages and the local scheduling information are multiplexed in at least one of the time domain, frequency domain, and spatial domain.

2. The method according to claim 1, wherein the control information controls a timing of the RTS/CTS procedure performed by the access point receiving the control information.

3. The method according to claim 1, wherein the control information controls frequency resources to be used in the RTS/CTS procedure performed by the access point receiving the control information.

4. The method according to claim 1, wherein the control information controls spatial resources to be used in the RTS/CTS procedure performed by the access point receiving the control information.

5. The method according to claim 1, wherein the control information indicates a remaining duration of the TXOP.

6. The method according to claim 1, wherein at least a part the control information is transmitted in a message dedicated to transmitting the control information.

7. The method according to claim 1, wherein the RTS messages respectively indicate a remaining duration of the TXOP.

8. The method according to claim 1, wherein the RTS messages are Multi-User RTS messages.

9. The method according to claim 1, wherein the RTS/CTS procedure respectively performed by each of the one or more access points sharing the TXOP comprises receiving a CTS message by the respective access point.

10. The method according to claim 9, wherein the CTS message indicates a remaining duration of the TXOP.

11. The method according to claim 1, wherein the wireless communication system is based on a Wireless Local Area Network technology according to the IEEE 802.11 standards family.

12. An access point for a wireless communication system, comprising:

at least one processor, and a memory containing program code executable by the at least one processor, the access point being configured to:

configure a carrier for communication with one or more wireless devices associated with the access point;

contend for access to the carrier at least with one or more other access points; cooperate with the one or m ore other access points by sharing a transmission opportunity, TXOP, reserved on the carrier by one of the access points in response to gaining access to the carrier, wherein said sharing of the TXOP is based on an invitation to participate in the sharing of the TXOP, the invitation being transmitted by the access point that gained access to the carrier to reserve the TXOP and to offer sharing of the TXOP;

before transmitting data in the shared TXOP, perform a Ready-to-Send/Clear-to-Send, RTS/CTS, procedure;

wherein the RTS/CTS procedure respectively performed by each of the access points sharing the TXOP comprises transmitting an RTS message by the respective access point;

based on control information transmitted from the access point that reserved the TXOP to the one or more other access points sharing the TXOP, coordinate the RTS/CTS procedure with an RTS/CTS procedure respectively performed by each of the one or more other access points sharing the TXOP, wherein at least a part the control information is transmitted in a message conveying the invitation to participate in the sharing of the TXOP wherein the sharing of the TXOP is based on local scheduling information respectively transmitted by each of the access points sharing the TXOP; and wherein the RTS messages and the local scheduling information are multiplexed in at least one of the time domain, frequency domain, and spatial domain.

13. The access point according to claim 12, whereby execution of the program code by the at least one processor causes the access point to configure the carrier, contend for access to the carrier, cooperate with the one or more other access points, perform the RTS/CTS procedure, and coordinate the RTS/CTS procedure with the RTS/CTS procedure respectively performed by each of the one or more other access points sharing the TXOP.

14. A system, comprising:

multiple access points each configured to:

configure a carrier for communication with one or more wireless devices associated with the access point;

contend at least with one or more other access points for access to the carrier;

cooperate with the one or more of the other access points by sharing a transmission opportunity, TXOP, reserved on the carrier by one of the access points in response to gaining access to the carrier, wherein said sharing of the TXOP is based on an invitation to participate in the sharing of the TXOP, the invitation being transmitted by the access point that gained access to the carrier to reserve the TXOP and to offer sharing of the TXOP;

before transmitting data in the shared TXOP, perform a Ready-to-Send/Clear-to-Send, RTS/CTS, procedure;

wherein the RTS/CTS procedure respectively performed by each of the access points sharing the TXOP comprises transmitting an RTS message by the respective access point:

based on control information transmitted from the access point that reserved the TXOP to the one or more other access points sharing the TXOP, coordinate the RTS/CTS procedure with an RTS/CTS procedure respectively performed by each of the one or more other access points sharing the TXOP, wherein at least a part the control information is transmitted in a message conveying the invitation to participate in the sharing of the TXOP, wherein the sharing of the TXOP is based on local scheduling information respectively transmitted by each of the access points sharing the TXOP; and wherein the RTS messages and the local scheduling information are multiplexed in at least one of the time domain, frequency domain, and spatial domain.

15. The system according to claim 14, further comprising:

at least one wireless device configured to receive data transmitted in the shared TXOP.

* * * * *